(12) United States Patent
Yu et al.

(10) Patent No.: US 12,222,217 B2
(45) Date of Patent: Feb. 11, 2025

(54) HILL CLIMBING ALGORITHM FOR CONSTRUCTING A LANE LINE MAP

(71) Applicant: GM Global Technology Operations LLC, Detroit, MI (US)

(72) Inventors: Bo Yu, Troy, MI (US); Fan Bai, Ann Arbor, MI (US); Gui Chen, Sterling Heights, MI (US); Joon Hwang, Pflugerville, TX (US); Carl P. Darukhanavala, Royal Oak, MI (US); Vivek Vijaya Kumar, Shelby Township, MI (US); Shu Chen, Rochester Hills, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 356 days.

(21) Appl. No.: 17/930,503

(22) Filed: Sep. 8, 2022

(65) Prior Publication Data

US 2024/0085210 A1    Mar. 14, 2024

(51) Int. Cl.
*G01C 21/30* (2006.01)
*G01C 21/00* (2006.01)

(52) U.S. Cl.
CPC ..... *G01C 21/3822* (2020.08); *G01C 21/3841* (2020.08); *G01C 21/3867* (2020.08)

(58) Field of Classification Search
CPC ............ G01C 21/3822; G01C 21/3841; G01C 21/3867
See application file for complete search history.

(56) References Cited

U.S. PATENT DOCUMENTS

| | | | |
|---|---|---|---|
| 11,287,278 B1* | 3/2022 | Tsoupko-Sitnikov | ........................ G01C 21/3453 |
| 11,578,981 B1* | 2/2023 | Tsoupko-Sitnikov | ........................ G01C 21/30 |
| 11,756,313 B2* | 9/2023 | Sarfraz | ................ G06F 18/217 382/104 |
| 2004/0114379 A1 | 6/2004 | Miller et al. | |
| 2014/0324339 A1 | 10/2014 | Adam et al. | |
| 2018/0154901 A1 | 6/2018 | Hasberg et al. | |
| 2019/0122386 A1 | 4/2019 | Wheeler et al. | |
| 2019/0154842 A1 | 5/2019 | Adachi | |
| 2020/0122721 A1* | 4/2020 | Zhang | ............. B60W 60/00272 |
| 2020/0249332 A1 | 8/2020 | Pandey et al. | |
| 2020/0363218 A1 | 11/2020 | Kim | |
| 2021/0009161 A1* | 1/2021 | Kim | ........................ H04W 4/40 |
| 2021/0206389 A1* | 7/2021 | Kim | ................... G01C 21/3885 |
| 2022/0269891 A1* | 8/2022 | Kaku | ........................ G06N 3/08 |
| 2022/0306156 A1* | 9/2022 | Wray | ................... G06V 20/588 |
| 2022/0315000 A1* | 10/2022 | Wray | ................... G05D 1/0212 |

(Continued)

*Primary Examiner* — Tyler J Lee
(74) *Attorney, Agent, or Firm* — Vivacqua Crane, PLLC (57) ABSTRACT

A method of creating a high-definition (HD) map of a roadway includes receiving a multi-layer probability density bitmap. The multi-layer probability density bitmap represents a plurality of lane lines of the roadway sensed by a plurality of sensors of a plurality of vehicles. The multi-layer probability density bitmap includes a plurality of points. The method further includes recursively conducting a hill climbing search using the multi-layer probability density bitmap to create a plurality of lines. In addition, the method includes creating the HD map of the roadway using the plurality of lines determined by the hill climbing search.

8 Claims, 6 Drawing Sheets

(56) References Cited

U.S. PATENT DOCUMENTS

| | | | |
|---|---|---|---|
| 2023/0091064 A1* | 3/2023 | Shuman | H04W 4/38 370/310 |
| 2023/0303111 A1* | 9/2023 | Stenneth | B60W 60/001 |
| 2024/0037961 A1* | 2/2024 | Kaku | G06T 7/73 |
| 2024/0068836 A1 | 2/2024 | Yu et al. | |

* cited by examiner

HILL CLIMBING ALGORITHM FOR CONSTRUCTING A LANE LINE MAP

INTRODUCTION

The present disclosure relates to a system and a method for constructing high-definition (HD) maps and, more particularly, to hill climbing algorithms for constructing a lane line map.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, HD maps are created using aerial or satellite imaging. Aerial imaging and satellite imaging are, however, quite expensive. Also, constructing HD maps using aerial or satellite imaging may require human labeling. It is therefore desirable to develop a system and method for constructing HD maps using inexpensive, effective, and efficient crowdsourcing approaches without human labeling.

SUMMARY

The present disclosure describes a method for creating a HD map of a roadway. In an aspect of the present disclosure, the method includes receiving a multi-layer probability density bitmap. The multi-layer probability density bitmap represents a plurality of lane lines of the roadway sensed by a plurality of sensors of a plurality of vehicles. The multi-layer probability density bitmap includes a plurality of points. The method further includes recursively conducting a hill climbing search or method using the multi-layer probability density bitmap to create a plurality of lines. In addition, the method includes creating the HD map of the roadway using the plurality of lines determined by the hill climbing search. In the present disclosure, the term "hill climbing search" is a local search algorithm which continuously moves in the direction of increasing elevation/value to find the peak of the mountain or best solution to the problem. The hill climbing search terminates when it reaches a peak value where no neighbor has a higher value. The method described above improves technology relating to the navigation of autonomous vehicles by creating improved HD map including lane lines using crowdsourcing from numerous vehicles.

In an aspect of the present disclosure, the method further includes receiving lane line data from the plurality of sensors and creating the multi-layer probability density bitmap using the lane line data.

In an aspect of the present disclosure, the method further includes determining a start point for each of the plurality of points of the multi-layer probability density bitmap.

In an aspect of the present disclosure, the start point may be determined by determining that a selected point satisfies a first condition, a second condition, and a third condition and determining that the selected point is the start point in response to determining that the selected point satisfies the first condition, the second condition, and the third condition. In an aspect of the present disclosure, the method further includes creating a new line solely using the start point.

In an aspect of the present disclosure, the first condition is that the selected point is a local peak. The second condition is that the selected point has been analyzed before using the hill climbing search. The third condition is that a density value of the selected point is greater than a predetermined, minimal density threshold.

In an aspect of the present disclosure, the selected point is a current exploring point. The method further includes finding a plurality of candidate points on a circle drawn around the current exploring point.

In an aspect of the present disclosure, the method further includes determining whether a selected candidate point is a good candidate for each of the plurality of candidate points.

In an aspect of the present disclosure, the candidate points are found by drawing the circle around the current exploring point. The circle is centered at the current exploring point and has a predetermined radius. Further, the method includes determining that a point on the circle is a local peak and determining that the point on the circle that is the local peak is one of the candidate points.

In an aspect of the present disclosure, the method further includes determining that a selected candidate point of the plurality of candidate points is a good candidate point in response to satisfying a first good candidate condition, a second good candidate condition, a third good candidate condition, and a fourth good candidate condition for each of the plurality of candidate points. The first good candidate condition is that a difference between a probability density bitmap value of the current exploring point and a probability density bitmap value of the selected candidate point is less than a predetermined density threshold. The second good candidate condition is that the current exploring point should not have been visited before. The third good candidate condition is that a smoothness value from of a line from the current exploring point to the selected candidate point is less than a predetermined smoothness threshold. The fourth good candidate condition is that a heading difference is less than a predetermined heading difference threshold. The heading difference is the difference between a first vector and a second vector. The first vector is from the current exploring point to the selected candidate point. The second vector is from a first node in the line to a second node. The second node is the current exploring node.

In an aspect of the present disclosure, the method further includes adding the selected candidate point to the new line in response to determining that the selected candidate point is a good candidate.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
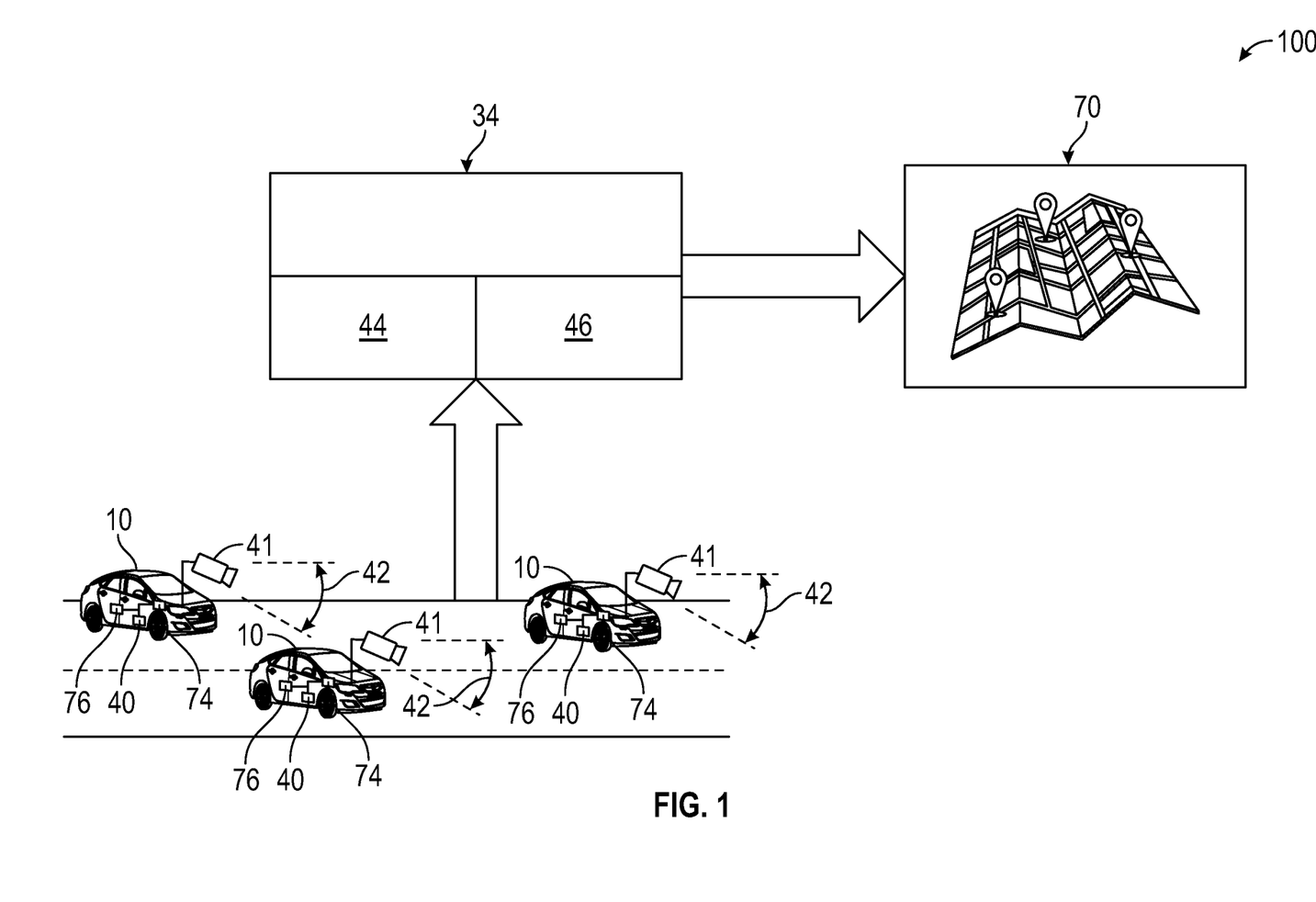
FIG. 1 is a block diagram depicting a system for lane line map construction using probability density bitmaps.

With reference to FIG. 1, a system 100 includes a plurality of vehicles 10 and a system controller 34 in communication with each of the vehicles 10. As non-limiting examples, the vehicles 10 may be pickup trucks, sedans, coupes, sport utility vehicles (SUVs), recreational vehicles (RVs), etc. Each of the vehicles 10 may be in wireless communication with the system controller 34 and includes one or more sensors 40. The sensors 40 collect information and generate sensor data indicative of the collected information. As non-limiting examples, the sensors 40 may include Global Positioning System (GPS) transceivers, yaw sensors, speed sensors, and forward-facing camera 41. The GPS transceivers are configured to detect the location of each vehicle 10. The speed sensors are configured to detect the speed of each vehicle 10. The yaw sensors are configured to determine the heading of each vehicle 10. The cameras 41 have a field of view 43 large enough to capture images of the roadways 62 in front of the vehicles 10. Specifically, the cameras 41 are configured to capture images of the lane lines 64 of the roadway 62 in front of the vehicles 10 and thereby detect the lane lines 64 of the roadway 62 in front of the vehicle 10. Because the vehicles 10 are in communication with the system controller 34, the system controller 34 is programmed to receive the sensor data from the sensors 40 (e.g., the lane line data from the cameras 41) of the vehicles 10. The lane line data includes lane line geometry data and lane line attribute data detected by the cameras 41 of the vehicles 20. The vehicles 10 are configured to send the sensor data from the sensors 40 to the system controller 34 using, for example, communication transceivers. The sensor data includes GPS data and lane lines data. The GPS data may be received from the GPS transceiver. The lane line data are not images. Rather, the lane line data includes lane lines in the form of polynomial curves reported by the camera 41 (e.g., front camera module) of the vehicle 10. Lane line data are originally from front camera data of the camera 41 but the lane lines are processed data (polynomial curves), instead of camera images.

Each vehicle 10 may include one or more vehicle controller 74 in communication with the sensors 40. The vehicle controller 74 includes at least one processor and a non-transitory computer readable storage device or media. The processor may be a custom made or commercially available processor, a central processing unit (CPU), a graphics processing unit (GPU), an auxiliary processor among several processors associated with the vehicle controller 74, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the 44 is powered down. The computer-readable storage device or media of the vehicle controller 74 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 74 in controlling the vehicle 10. For example, the vehicle controller 74 may be configured to autonomously control the movements of the vehicle 10.

Each of the vehicles 10 may include an output device 76 in communication with the vehicle controller 74. The term "output device" is a device that receives data from the vehicle controller 74 and carries data that has been processed by the vehicle controller 74 to the user. As a non-limiting example, the output device 76 may be a display in the vehicle 10.

Figure 2:
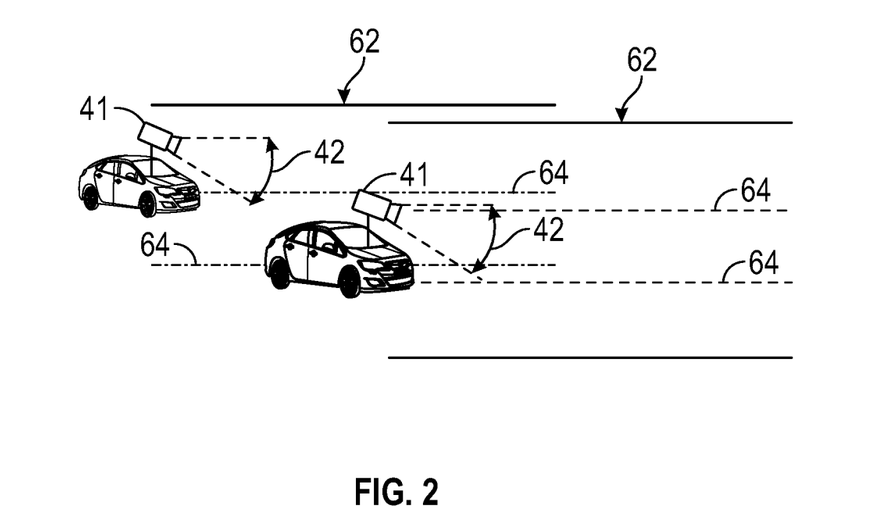
FIG. 2 is a schematic diagram depicting a plurality of vehicles taking images of the lane lines of a roadway.
Figure 3:
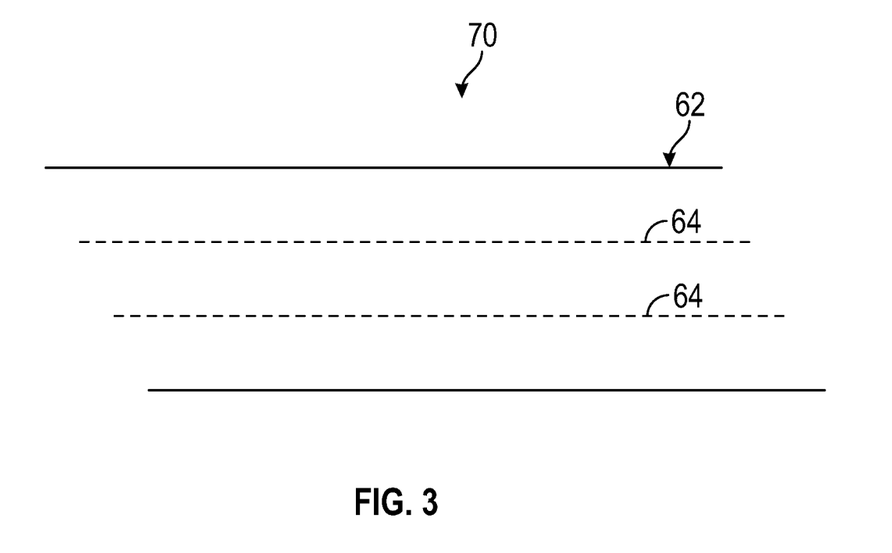
FIG. 3 is a schematic diagram depicting a HD map created by the system of FIG. 1.

With reference to FIGS. 1, 2, and 3, the system controller 34 is programmed to receive the sensor data (e.g., sensed lane line data and vehicle GPS data) from the vehicles 10 and may be configured as a cloud-based system. The sensed lane line data includes information about the lane lines 64 observed by the cameras 41, such as lane line color, lane line type (e.g., solid or broken lines), geometry of the lane line, among other this. The vehicle GPS data is indicative of the location of the vehicle 10. The system controller 34 is configured to receive sensor data collected by the sensors 40 of the vehicles 10. The vehicles 10 sends the sensor data to the system controller 34. Using, among other things, the sensor data from the vehicles 10, the system controller 34 is programmed to construct a lane line map using the probability density bitmaps. Then, the system controller 34 outputs a high-definition (HD) map, including details about the lane lines 64 of the roadway 62. In the present disclosure, the term "HD map" means a highly precise map used in autonomous driving, which contains details at a centimeter level. As shown in FIG. 3, the HD map 70 includes a representation of the roadway 62 and the lane lines 64 in the roadway 62. In the present disclosure, the term "lane line" means a solid or broken paint line or other marker line separating lanes of traffic moving in the same direction or opposite directions. HD map 70 may be shown to the vehicle user through the output device 76 (e.g., display).

The system controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the system controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The system controllers 34 may be programmed to execute the methods below described in detail below, such as the method 200 (FIG. 4).

The instructions may include one or more separate programs, each of which comprises an ordered listing of executable instructions for implementing logical functions. The instructions, when executed by the processor 44, receive and process signals from the sensors 40, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single system controller 34 is shown in FIG. 1, embodiments of the system 100 may include a plurality of system controllers 34 that communicate over a suitable communication medium or a combination of communication mediums and that cooperate to process the sensor signals, perform logic, calculations, methods, and/or algorithms, and generate control signals to automatically control features of the system 100. In various embodiments, one or more instructions of the system controller 34 are embodied in the system 98. The non-transitory computer readable storage device or media 46 includes machine-readable instructions (shown, for example, in FIG. 4), that when executed by the one or more processors, cause the processors to execute the method 200 (FIG. 4).

Figure 4:
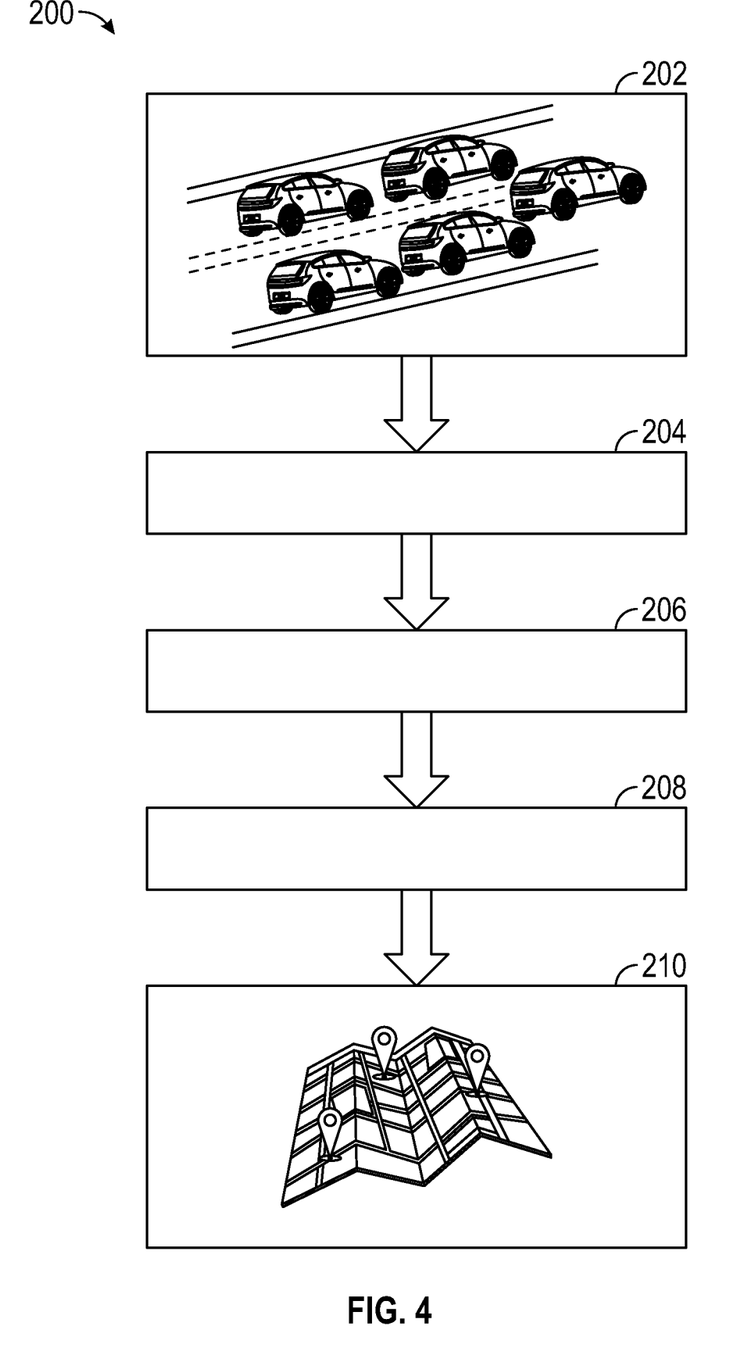
FIG. 4 is a flowchart of a method for constructing lane line maps using probability density bitmaps.

FIG. 4 is a flowchart of the method 200 for constructing lane line maps using probability density bitmaps. The system controller 34 is programmed to execute the method 200, and the method 200 begins at block 202. At block 202, the system controller 34 crowdsources sensor data about to the lane lines 64 of one or more roadways 62. In other words, at block 202, the system controller 34 receives sensor data about the lane lines 64 from a plurality of vehicles 10 (e.g., thousands of vehicles 10). As discussed above, the sensor data is collected by the sensors 40 of the vehicles 10. For example, the sensor data may include images (i.e., image data) captured by the cameras 41 of the vehicles 10. These images show the lane lines 64 of the roadway 62. Then, the method 200 proceeds to block 204.

At block 204, the system controller 34 executes a GPS bias correction. In other words, the system controller 34 corrects an internal bias of the GPS transceiver (i.e., one of the sensors 40) to output a more accurate location of the vehicle 10. Then, the method 200 continues to block 206.

At block 206, the system controller 34 executes a GPS random noise reduction process. In other words, the system controller 34 may reduce the noise from the GPS transceiver (i.e., one of the sensors 40) to output a more accurate location of the vehicle 10. Then, the method 200 continues to block 208.

Figure 5:
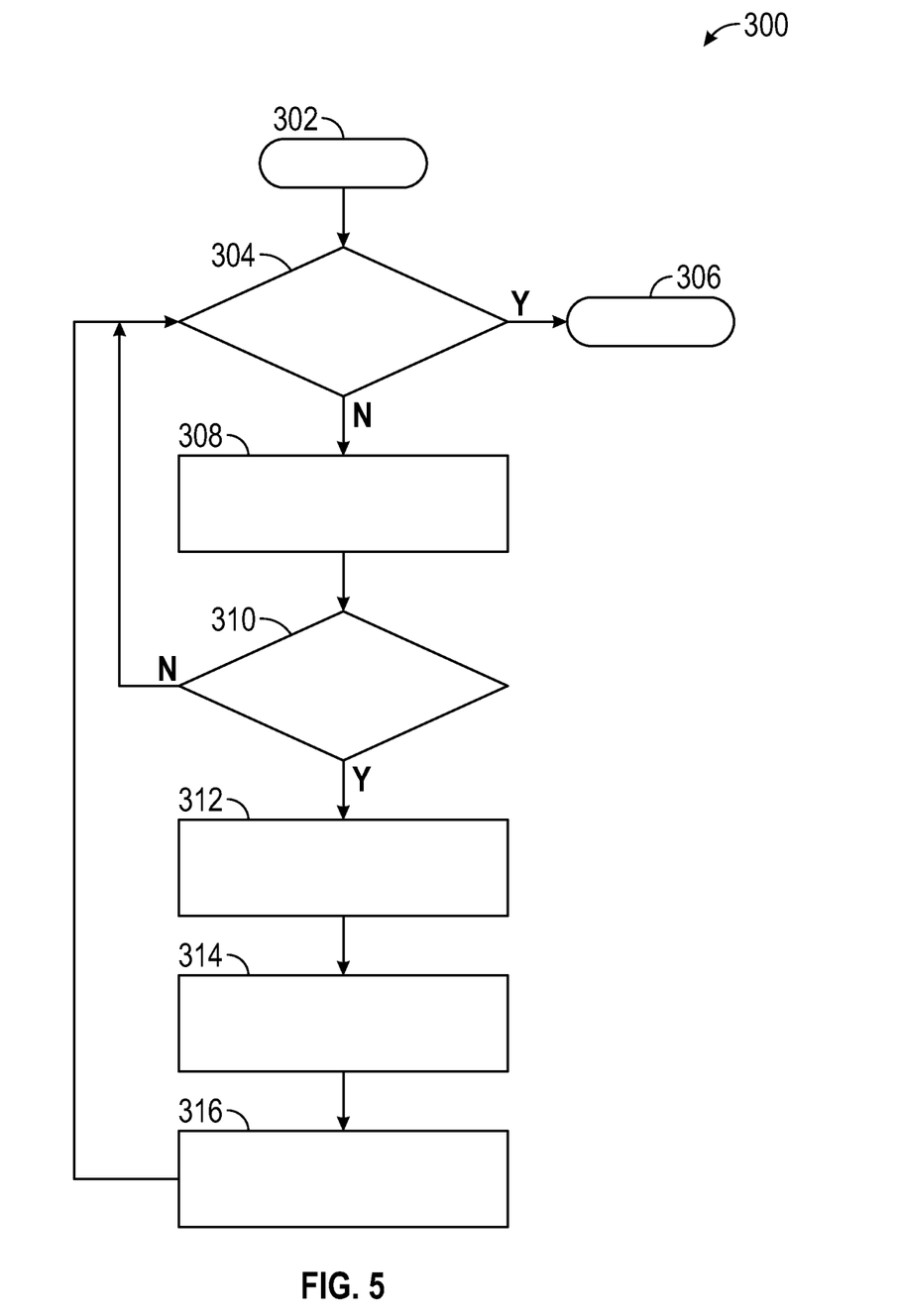
FIG. 5 is a flowchart of the hill-climb method, which is part of the method of FIG. 4.

At block 208, the system controller 34 constructs a bitmap-based lane line map using the sensor data collected by the sensors 40 of the plurality of vehicles 10. In doing so, the system controller 34 may use GPS data, lane line data, heading data, and speed data of the plurality of vehicles 10. Specifically, the system controller 34 creates a plurality of multi-layer bitmaps for each of the vehicles 10 using the sensor data. Then, the system controller 34 aggregates or fuses creates the multi-layer bitmaps of each of the vehicles 10 to create multi-layer probability density bitmaps to represent the observed lane lines. Each of the multi-layer probability density bitmaps includes a plurality of pixels (i.e., points). As discussed below, the system controller 34 uses a hill-climb algorithm or method 300 (FIG. 5). The hill-climb algorithm 300 (FIG. 5) may be referred to as the hill climbing search and receives one or more multi-layer probability density bitmaps as an input and generates a list of lines as an output. This list of lines includes lane line data (e.g., geometry, type (i.e., solid or broken) and color of the lane lines 64) and is representative of the lane lines 64 of the roadway 62. The system controller 34 then extracts lane line data (e.g., geometry, type (i.e., solid or broken), and color of the lane lines 64) from the multi-layer probability density bitmaps to create the HD map 70 of the roadway 62 using multi-layer probability density bitmaps. Next, the method 200 continues to block 210.

At block 210, the system controller 34 outputs the HD map 70 of the roadway 62, which includes lane lines 64. The system controller 34 may send the HD map 70 of the roadway 62 to the vehicle controller 74. The vehicle controller 74 may then command the output device 76 (e.g., display) to show the HD map 70 of the roadway 62. Once the vehicle controller 74 receives the HP map of the roadway 62, the vehicle controller 74 may autonomously control the movement of the vehicle using the HD map 70 of the roadway 62.

FIG. 5 is a flowchart of the hill-climb algorithm 300. The present disclosure describes a hill climbing algorithm or method 300 that extracts lane lines from a probability density bitmap generated from crowd-sourced vehicle sensor data. This method may also be used to extract road topology, average vehicle GPS trajectories, average pedestrian trajectories, river topology, etc., using crowd-sourced sensor data from vehicles or mobile devices. Crowd-sourcing vehicle sensor data are noisy sensor data collected from multiple vehicles. The noisy sensor data may be represented by a probability density bitmap. A bitmap data structure may therefore represent a specific geographical area. A pixel (x,y) in the probability density bitmap represents certain geographical coordinates, such as GPS latitude and longitude. Each pixel value represents the probability of a geographical object being observed at the corresponding geographical coordinates. However, there is a need to develop an algorithm to extract line-like geographical objects from the probability density bitmap. Line-like geographical objects may include, but are not limited to, lane lines, road topologies, average GPS trajectories, river topologies, etc.

The presently disclosed hill climbing algorithm considers a probability density map as a topographic map (i.e., a terrain map). The high probability spot (i.e., the bright spot) is the peak of a hill, and the low probability spot (i.e., dark spot) is the valley of a hill. The presently disclosed hill climbing algorithm simulates that a hiker is hiking on the ridge of a hill and records hiking trajectories as the system output (i.e., line-like objects, such as lane lines). In the presently disclosed hill climbing algorithm, the input is a probability density bitmap, and the output is a number of lines, each being defined by a sequence of points.

The hill-climb algorithm 300 simulates a hiker that is hiking on the ridge of a hill and may be referred to as the hill-climb method or the hill-climb search. The hill-climb algorithm 300 begins at block 302. At block 302, the system controller 34 receives one or more multi-layer probability density bitmaps created at block 208. Then, the hill-climb algorithm 300 proceeds to block 304. At block 304, the system controller 34 determines if all the pixels or points of the multi-layer probability density bitmaps have been processed. In other words, the system controller 34 determines if all the pixels of the multi-layer probability density bitmap(s) have undergone all of the steps of the hill-climb algorithm 300. If all of the pixels of the multi-layer probability density bitmap(s) have been processed, then the hill-climb algorithm 300 proceeds to block 306. At block 306, the system controller 34 ends the hill-climb algorithm 300. If not all the pixels of the multi-layer probability density bitmaps have been processed, the hill-climb algorithm 300 continues to block 308.

At block 308, the system controller 34 selects the next pixel or point of the multi-layer probability density bitmaps that has not been processed by the hill-climb algorithm 300. Then, the hill-climb algorithm 300 continues to block 310. At block 310, the system controller 34 determines whether pixel or point selected at block 308 is a start point. The system controller 34 starts with an initial pixel of the multi-layer probability density bitmap and checks whether each pixel is a good start point. A pixel of the multi-layer probability density bitmap is a start point if it satisfies three conditions. The first condition is that the pixel or point is a local peak. In other words, the first condition is satisfied if the pixel value of the selected pixel is greater than the surrounding pixels. The second condition is that the pixel has not been visited (i.e., processed) by the hill-climb algorithm 300. A visit history bitmap, which is a separate data structure, is used to allow the system controller 34 to track whether the hill-climb algorithm has visited (i.e., processed) a pixel (point). At the very beginning, the visit history bitmap is all black, and the pixel value of all pixels is zero. The third condition is that the density value of the pixel or point is greater than a predetermined, minimal density threshold. If the three conditions are met, then the system controller 34 determines that the selected pixel is the start point and the hill-climb algorithm proceeds to block 312. If one or more of the conditions are not met, then the system controller 34 determines that the selected pixel is not the start point and the hill-climb algorithm 300 returns to block 304. After determining that the selected pixel is the start point, the hill-climb algorithm 300 continues to block 312. This simulates that the hiker starts hiking from this start point.

At block 312, the system controller 34 creates a new line that only contains the selected pixel. Thus, at this point, this new line contains a single point or pixel. In the present disclosure, the terms "point" and "pixel" are used interchangeably. Then, the hill-climb algorithm 300 continues to block 314.

At block 314, the hill-climb algorithm 300 calls a ridge-hiking function recursively. The ridge-hiking function is performed according to ridge-hiking method 400 (FIG. 6), which is described in detail below. The ridge-hiking method 400 (FIG. 6) receives the new line with a single pixel (i.e., the selected pixel that is a start point) as an input and outputs a new line with multiple points in addition to the selected pixel that is the start point. Then, the hill-climb algorithm 300 continues to block 316. This simulates that the hiker hikes along the ridge of a hill.

At block 316, the new line with multiple points determined by the ridge-hiking method 400 (FIG. 6) is added to an output of the hill-climb algorithm 300. The new line represents the trajectory of the hiker which starts from the start point. The output of the hill-climb algorithm 300 includes a list of lines representative of the lane lines 64 of the roadway 62.

Figure 6:
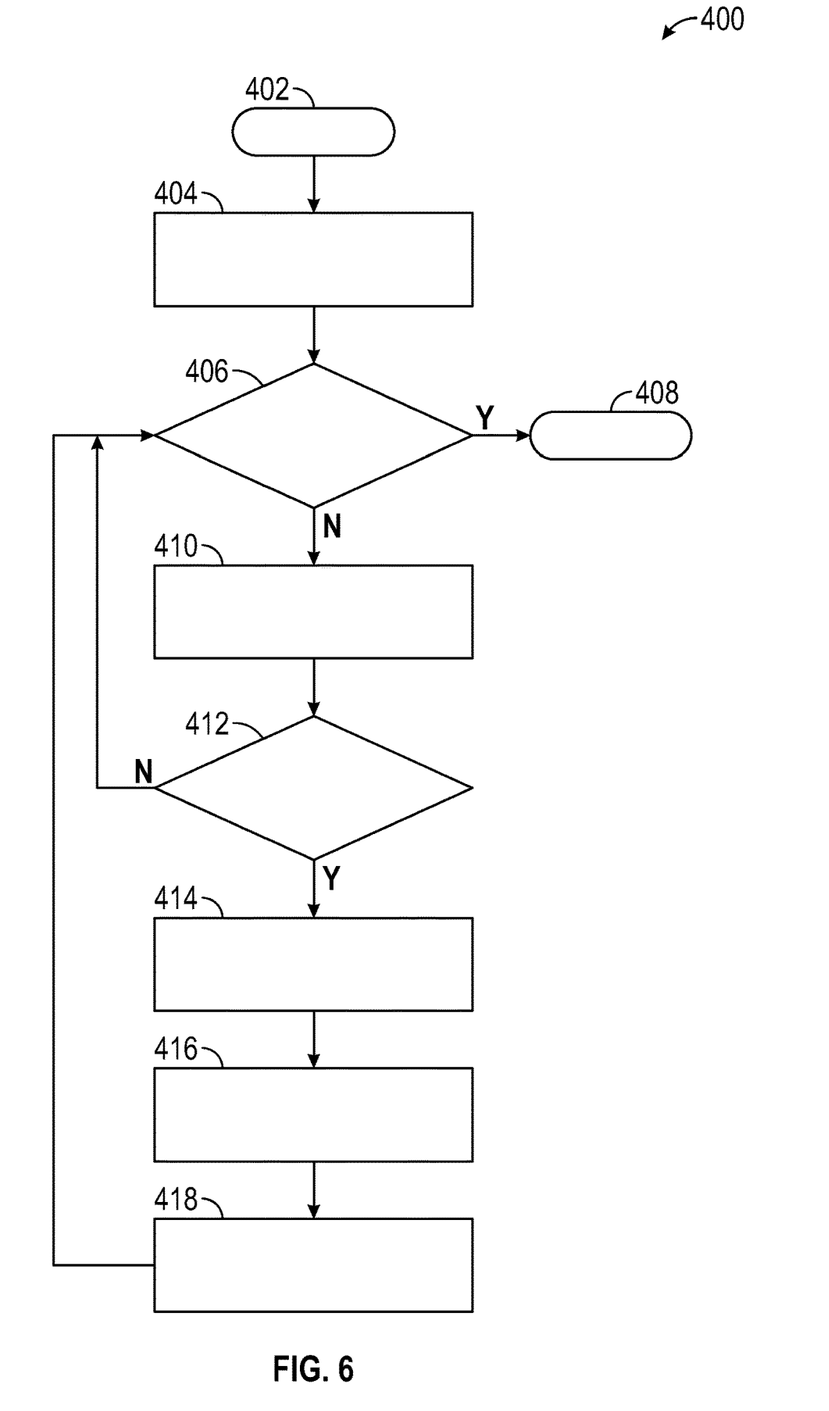
FIG. 6 is a flowchart of the ridge-hiking method, which is part of the hill-climb method of FIG. 5.

FIG. 6 is a flowchart of the ridge-hiking method 400. The ridge-hiking method 400 begins at block 402. At block 402, the system controller 34 receives a line (i.e., a line object) as an input. The input may be a linked list of points. At block 402, the system controller 34 receives the new line created at block 312 (FIG. 5) as an input. In addition, at block 402, the system controller 34 receives an exploring point as an input. The exploding point is a head or a tail of the line (i.e., the line object). In the present disclosure, the exploring point is the selected pixel that is determined to be the start point at block 310 (FIG. 5). Then, the ridge-hiking method 400 proceeds to block 404.

At block 404, the system controller 34 finds all the candidate points in a circle for the next step of the ridge-hiking method 400. To do so, the system controller 34 draws a circle around the current exploring point. The current exploring point is considered to be a hiker's current location. The circle has a predetermined radius, which has been determined through testing. The circle is centered at the current exploring point with the predetermined radius. The predetermined radius is a system parameter. For example, the predetermined radius may be one meter or five pixels. The predetermined radius defines the step length of the hiker. The system controller 34 then identifies all the points on the drawn circle. The identified points are referred to as the candidate points. The ridge-hiking method 400 calls a find candidate points function to execute block 404. The find candidate points function is performed according to a find candidate point method 500 (FIG. 7), which is described in detail below. Then, the ridge-hiking method 400 proceeds to block 406.

At block 406, the system controller 34 checks whether all the candidate points have been tested or visited. In other words, the system controller 34 determines whether all candidate points have been analyzed with the processes in blocks 410, 412, 414, 416, and 418. If all the candidate points have been tested or visited, then the ridge-hiking method 400 proceeds to block 408. At block 408, the ridge-hiking method 400 ends and outputs a line (i.e., a line object) with more points that the line used as an input for the ridge-hiking method 400. This is the same output described above with respect to block 316 (FIG. 5). If not all the candidate points have been tested or visited, then the ridge-hiking method 400 proceeds to block 410.

At block 410, the system controller 34 selects the next candidate point that has not been tested or visited. In other words, the system controller 34 selects the next candidate point that has not been analyzed with the processes in blocks 412, 414, 416, and 418. Therefore, the system controller 34 executes the processes in blocks 412, 414, 416, and 418 for each candidate point. Then, the ridge-hiking method 400 continues to block 412.

At block 412, the system controller 34 determines whether the selected candidate point is a good candidate point. To do so, the system controller 34 calls a good candidate function. The good candidate function determines whether the selected candidate point is a good candidate point if four conditions are met. The first condition is whether the difference between the probability density bitmap value of the exploring point and the probability density bitmap value of the selected candidate is less than a predetermined density threshold. The system controller 34 may determine whether the first condition is met using the following equation:

$$|bitmap(exploring\ point) - bitmap(candidate\ point)| < density\ threshold$$

where:
- bitmap(exploring point) is the probability density bitmap value of the exploring point;
- bitmap(candidate point) is the probability density bitmap value of the selected candidate point; and density threshold is the predetermined density threshold.

The second condition is that the exploring point should not have been visited before. Here, the system controller 34 determines whether the selected exploring point has not been analyzed with the processes in blocks 412, 414, 416, and 418. The third condition is that the smoothness value from of the line from the selected exploring point to the candidate point is less than a predetermined smoothness threshold. In the present disclosure, the term "smoothness" means the variance of the pixel density values for the pixels on the line from the selected exploring point to the selected candidate point. The fourth condition is that a heading difference is less than a predetermined heading difference threshold. The heading difference is the difference between two vectors. The first vector is from the selected exploring point to the selected candidate point. The second vector is from a (n−1)th node in the line to a (n)th node, wherein the (n)th node is the current exploring node. To satisfy the fourth condition, the heading difference between these two vectors should be less than the predetermined heading difference threshold. If the first condition, the second condition, the third condition, and the fourth condition are satisfied, then the system controller 34 determines that the candidate point is a good point. It is envisioned, however, that one or multiple conditions could be utilized to determine whether the candidate point is a good point.

At block 412, if the system controller 34 determines that the candidate point is not a good point as explained above, then the ridge-hiking method 400 returns to block 406. However, if the system controller 34 determines that the candidate point is a good point, then the ridge-hiking method 400 continues to block 414.

At block 414, the system controller 34 adds the candidate point (which has been determined to be a good point) to the line inputted at block 404. In other words, the hike moves one step from the exploring point to the candidate point. Further, the trajectory of the hiker is recorded. In other words, the line with the added point (i.e., the candidate point determined to be a good point) is recorded. Then, the system controller 34 proceeds to block 416. At block 416, the system controller 34 sets the visit history bitmap to indicate that the candidate point has been analyzed (i.e., visited). As a non-limiting example, a thick line may be drawn to indicate the visited candidate points in the visit history bitmap. Then, the ridge-hiking method 400 continues to block 418.

At block 418, the ridge-hiking method 400 calls itself to explore the next candidate point. If this candidate point is a good candidate, then the current good candidate becomes an exploring point. Then, the ridge-hiking method 400 returns to block 406 to analyze the current exploring point. The ridge-hiking method 400 is a recursive process. When there is no good candidate point found in one recursive iteration, the recursion stops. But during the recursive process, more points are added to the line object to track the hiker's trajectory.

Figure 7:
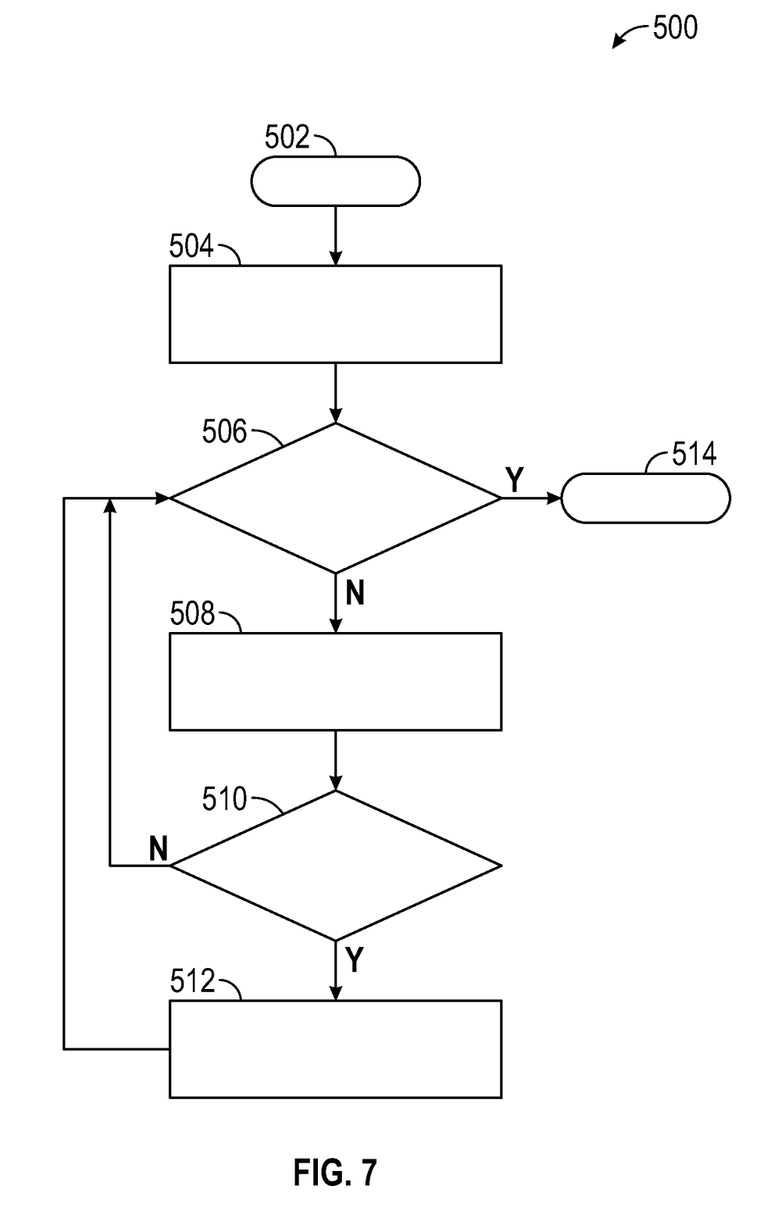
FIG. 7 is a flowchart of a find candidate point method, which is part of the hill-climb method of FIG. 5.

FIG. 7 is a flowchart of a find candidate point method 500, which begins at block 502. At block 502, the system controller 34 receives the current exploring point and the predetermined radius as an input. Then, the find candidate point method 500 proceeds to block 504. Block 504 is the same process as block 404 (FIG. 6). At block 504, the system controller 34 finds all the candidate points in a circle for the next step of the ridge-hiking method 400. To do so, the system controller 34 draws a circle centered around the current exploring point. The current exploring point is therefore the center of the circle. The circle has a predetermined radius, which has been determined through testing. The predetermined radius is a system parameter. For example, the predetermined radius may be one meter or five pixels. The predetermined radius defines the step length of the hiker. The system controller 34 then identifies all the points on the drawn circle. The identified points are referred to as the candidate points. Then, the find candidate point method 500 continues to block 506.

At block 506, the system controller 34 determines if all the points in the circle have been tested. In other words, the system controller 34 determines if all the points in the circle have been analyzed according to the blocks 510, and 512. If all the points in the circle have been tested, then the find candidate point method 500 continues to block 514. At block 514, the find candidate point method 500 ends and outputs a list of candidate points. However, if not all the points in the circle have been tested, then the find candidate point method 500 proceeds to block 508.

At block 508, the system controller 34 identifies the next point in the circle that has not been tested using the processes of block 508, 510, and 512. Then, the find candidate point method 500 proceeds to block 510. At block 510, the system controller 34 determines whether the point in the circle identified in block 508 is a local peak. In the present disclosure, the term "local peak" means a data sample that is larger than its two neighboring samples. If the point in the circle identified in block 508 is a not local peak, then the find candidate point method 500 returns to block 506. However, if the point in the circle identified in block 508 is a local peak, then the find candidate point method 500 continues to block 512. At block 512, the system controller 34 appends (or adds) the point in the circle identified in block 508 to the output at block 514. As discussed above, the output of the find candidate point method 500 is a list of candidate points. After executing block 512, the find candidate point method 500 returns to block 506.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of creating a high-definition (HD) map of a roadway, comprising:
   receiving a multi-layer probability density bitmap, wherein the multi-layer probability density bitmap represents a plurality of lane lines of the roadway sensed by a plurality of sensors of a plurality of vehicles, and the multi-layer probability density bitmap includes a plurality of points;
   conducting a hill climbing search using the multi-layer probability density bitmap to create a plurality of lines;
   determining a start point for each of the plurality of points of the multi-layer probability density bitmap by determining that a selected point satisfies a first condition, a second condition, and a third condition, and determining that the selected point is the start point in response to determining that the selected point satisfies the first condition, the second condition, and the third condition, and wherein the selected point is a current exploring point;
   finding a plurality of candidate points from the plurality of points wherein, for each of the plurality of candidate points, determining whether a selected candidate point of the plurality of candidate points is a good candidate in response to satisfying a first good candidate condition, a second good candidate condition, a third good candidate condition, and a fourth good candidate condition, and wherein the first good candidate condition is that a difference between a probability density bitmap value of the current exploring point and a probability density bitmap value of the selected candidate point is less than a predetermined density threshold, the second good candidate condition is that the current exploring point should not have been visited before, the third good candidate condition is that a smoothness value from of a line from the current exploring point to the selected candidate point is less than a predetermined smoothness threshold, and the fourth good candidate condition is that a heading difference is less than a predetermined heading difference threshold, the heading difference is the difference between a first vector and a second vector, the first vector is from the current exploring point to the selected candidate point, and the second vector is from a first node in the line to a second node, and the second node is the current exploring node;
   creating the HD map of the roadway using the plurality of lines determined by the hill climbing search.

2. The method of claim 1, further comprising receiving lane line data from the plurality of sensors and creating the multi-layer probability density bitmap using the lane line data.

3. The method of claim 2, further comprising creating a new line solely using the start point.

4. The method of claim 3, wherein:
   the first condition is that the selected point is a local peak;
   the second condition is that the selected point has not been analyzed before using the hill climbing search; and
   the third condition is that a density value of the selected point is greater than a predetermined, minimal density threshold.

5. The method of claim 4, wherein finding the plurality of candidate points includes finding the plurality of candidate points on a circle drawn around the current exploring point.

6. The method of claim 5, wherein finding the plurality of candidate points on the circle drawn around the current exploring point comprises:
   drawing the circle around the current exploring point, wherein the circle is centered at the current exploring point, and the circle has a predetermined radius;
   determining that a point on the circle is a local peak; and
   determining that the point on the circle that is the local peak is one of the plurality of candidate points.

7. The method of claim 6, further comprising adding the selected candidate point to the new line in response to determining that the selected candidate point is the good candidate.

8. A tangible, non-transitory, machine-readable medium, comprising machine-readable instructions, that when executed by one or more processors, cause the processors to:
   receive a multi-layer probability density bitmap, wherein the multi-layer probability density bitmap represents a plurality of lane lines of a roadway sensed by a plurality of sensors of a plurality of vehicles, and the multi-layer probability density bitmap includes a plurality of points;
   recursively conduct a hill climbing search using the multi-layer probability density bitmap to create a plurality of lines; and
   create a high-definition (HD) map of the roadway using the plurality of lines determined by the hill climbing search;
   receive lane line data from the plurality of sensors;
   create the multi-layer probability density bitmap using the lane line data;
   determine a start point for each of the plurality of points of the multi-layer probability density bitmap;
   determine that a selected point satisfies a first condition, a second condition, and a third condition;
   determine that the selected point is the start point in response to determining that the selected point satisfies the first condition, the second condition, and the third condition, wherein the first condition is that the selected point is a local peak, the second condition is that the selected point has not been analyzed before using the hill climbing search, and the third condition is that a density value of the selected point is greater than a predetermined, minimal density threshold;

find a plurality of candidate points on a circle drawn around a current exploring point, wherein the selected point is the current exploring point;

determine whether a selected candidate point is a good candidate point for each of the plurality of candidate points; and determine that the selected candidate point of the plurality of candidate points is the good candidate point in response to satisfying a first good candidate condition, a second good candidate condition, a third good candidate condition, and a fourth good candidate condition, wherein the first good candidate condition is that a difference between a probability density bitmap value of the current exploring point and a probability density bitmap value of the selected candidate point is less than a predetermined density threshold, the second good candidate condition is that the current exploring point should not have been visited before, the third good candidate condition is that a smoothness value from of a line from the current exploring point to the selected candidate point is less than a predetermined smoothness threshold, and the fourth good candidate condition is that a heading difference is less than a predetermined heading difference threshold, the heading difference is the difference between a first vector and a second vector, the first vector is from the current exploring point to the selected candidate point, and the second vector is from a first node in the line to a second node, and the second node is the current exploring point.

\* \* \* \* \*